(12) United States Patent
Weir

(10) Patent No.: US 11,587,561 B2
(45) Date of Patent: Feb. 21, 2023

(54) COMMUNICATION SYSTEM AND METHOD OF EXTRACTING EMOTION DATA DURING TRANSLATIONS

(71) Applicant: Mary Lee Weir, Vero Beach, FL (US)

(72) Inventor: Mary Lee Weir, Vero Beach, FL (US)

(*) Notice: Subject to any disclaimer, the term of this patent is extended or adjusted under 35 U.S.C. 154(b) by 155 days.

(21) Appl. No.: 16/664,397

(22) Filed: Oct. 25, 2019

(65) Prior Publication Data

US 2021/0125608 A1 Apr. 29, 2021

(51) Int. Cl.
| | |
|---|---|
| *G10L 15/22* | (2006.01) |
| *G10L 15/07* | (2013.01) |
| *G10L 15/18* | (2013.01) |
| *G06F 40/58* | (2020.01) |
| *G10L 25/63* | (2013.01) |

(52) U.S. Cl.
CPC .............. *G10L 15/22* (2013.01); *G10L 15/07* (2013.01); *G10L 15/1815* (2013.01); *G10L 15/1822* (2013.01); *G06F 40/58* (2020.01); *G10L 25/63* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 7,944,448 | B2* | 5/2011 | Iwamura | G06Q 90/00 345/473 |
| 8,032,356 | B2* | 10/2011 | Narayanan | G06F 40/284 704/2 |
| 8,346,563 | B1* | 1/2013 | Hjelm | G10L 15/1822 704/251 |
| 9,342,509 | B2* | 5/2016 | Meng | G10L 13/08 |
| 10,579,742 | B1* | 3/2020 | Fernandez | H04L 51/046 |
| 2003/0167167 | A1* | 9/2003 | Gong | G10L 13/033 704/250 |
| 2007/0208569 | A1* | 9/2007 | Subramanian | G10L 19/0018 704/270 |
| 2010/0169091 | A1* | 7/2010 | Zurek | G06Q 30/02 704/235 |
| 2011/0246172 | A1* | 10/2011 | Liberman | G06F 40/58 704/2 |
| 2015/0134456 | A1* | 5/2015 | Baldwin | H04W 8/18 705/14.64 |
| 2015/0169284 | A1* | 6/2015 | Quast | G06F 16/9535 704/275 |

(Continued)

*Primary Examiner* — Richard Z Zhu
(74) *Attorney, Agent, or Firm* — Ingram IP Law, P.A.

(57) ABSTRACT

A communication system is provided that generates human emotion metadata during language translation of verbal content. The communication system includes a media control unit that is coupled to a communication device and a translation server that receive verbal content from the communication device in a first language. An adapter layer having a plurality of filters determines emotion associated with the verbal content, wherein the adapter layer associates emotion metadata with the verbal content based on the determined emotion. The plurality of filters may include user-specific filters and non-user-specific filters. An emotion lexicon is provided that links an emotion value to the corresponding verbal content. The communication system may include a display that graphically displays emotions alongside the corresponding verbal content.

20 Claims, 7 Drawing Sheets

(56) References Cited

U.S. PATENT DOCUMENTS

| | | | |
|---|---|---|---|
| 2016/0163332 A1* | 6/2016 | Un | G10L 13/08 |
| | | | 704/260 |
| 2017/0109336 A1* | 4/2017 | Bruno | G06F 40/103 |
| 2018/0101776 A1* | 4/2018 | Osotio | G06F 16/258 |
| 2019/0095775 A1* | 3/2019 | Lembersky | G06N 20/00 |
| 2019/0108221 A1* | 4/2019 | Nelson | H04M 7/0012 |
| 2020/0279553 A1* | 9/2020 | McDuff | G10L 25/78 |

\* cited by examiner ized emotion, emotion recognition system, and method for extracting emotion data during translations.

COMMUNICATION SYSTEM AND METHOD OF EXTRACTING EMOTION DATA DURING TRANSLATIONS

FIELD OF THE TECHNOLOGY

The technology relates to extracting emotion data during translations, More particularly, the technology relates to presenting the extracted emotion through a hologram or other output image that includes a speaker's mannerisms and voice data adjusted to deliver a speaker's emotion.

BACKGROUND OF THE TECHNOLOGY

Humans communicate verbally and textually using both content and delivery. With respect to verbal communications delivery may include voice intonations, tone, stress, and rhythm that convey speaker emotions or the like. For example, delivery may include rising and/or falling voice levels, intensity, speech pattern, or the like. With respect to textual communications, delivery may include using emojis, lowercase letter, uppercase letters, word pairings, or the like. Recipients of direct communications perceive content and delivery firsthand during an interaction and can formulate a response accordingly.

Humans who do not share a same language must rely on language translation systems such as natural speech recognition systems that enable devices to recognize whole sentences and interpret them. For example, automatic speech recognition (ASR) systems decipher text from continuous human speech. Advancements to ASR include training a system to decipher text from natural human speech instead of training a human to speech in terms understood by a system.

Large vocabulary ASR systems atomize spoken words into acoustic representations of linguistic phenomes. Phenomes are the smallest phonetic unit in a language that is capable of conveying a distinction in meaning. For example, the English language contains approximately forty (40) separate and distinct phenomes that make up the entire spoken language, e.g., consonants, vowels, and other sounds. Conventional ASR systems filter out stray sounds, tones, and pitches that are not consistent with phonemes and translate the phonemes into a gender-neutral and monotonic audio stream. Conventional ASR systems perform word recognition by extracting phonemes from sound waves of the filtered speech and creating weighted chains of phonemes that represent a probability of word instances. Accordingly, conventional ASR systems to provide speech content derived from the phonemes.

Conventional translation systems have limited capabilities of providing information regarding the delivery of the human communication. For example, the delivery may include an emotional state of the speaker. Emotions may be inferred from a speaker's voice by deducing acoustic and prosodic information contained in delivery of the human speech. Typically, techniques for deducing speaker emotions from voice data involves utilizing complex speaker dependent models of emotional state.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DESCRIPTION OF THE TECHNOLOGY

Figure 1A:
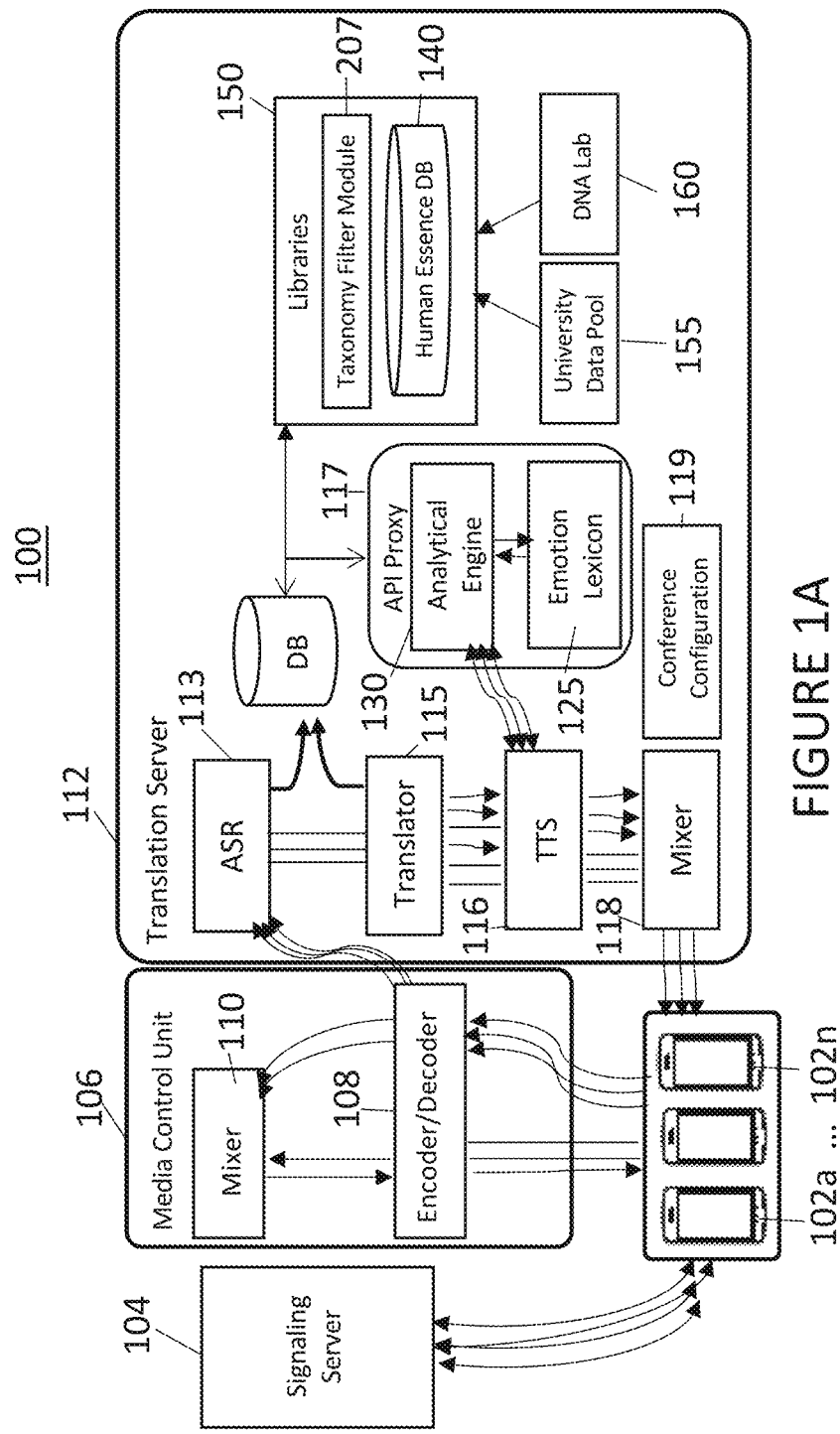
FIG. 1A illustrates a communication system according to one example of the technology.

What is needed is a system and method of deducing a speaker's emotions from non-speaker dependent models. For example, what is needed is an emotion recognition system and method that determine an emotional state of the speaker based on acoustic information obtained from the relevant speech such as pitch, tone, cadence, amplitude, or combinations thereof. A system may recognize human emotions through analyzing human speech for emotional content. For example, the system may analyze a speaker's voice for speech patterns and corresponding acoustic information. In contrast to textual recognition devices that filter speech into a gender-neutral and monotonic audio stream, the technology described herein employs tone, timbre, and speech gender, or the like, to determine speaker emotion.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, signals, or other matter between the so-described components. The term "substantially" is defined to be essentially conforming to the thing that it "substantially" modifies, such that the thing need not be exact. For example, substantially real-time means that the occurrence may happen without noticeable delay but may include a slight delay.

The terms "circuit," "circuitry," and "controller" may include either a single component or a plurality of components, which are either active and/or passive components and may be optionally connected or otherwise coupled together to provide the described function. The "processor" described in any of the various embodiments includes an electronic circuit that can make determinations based upon inputs and is interchangeable with the term "controller." The processor can include a microprocessor, a microcontroller, and a central processing unit, among others, of a general-purpose computer, special purpose computer, ASIC, or other programmable data processing apparatus. While a single processor can be used, the present disclosure can be implemented over a plurality of processors.

The "server" described in any of the various examples includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and applications software that support the services provided by the server.

According to one example, the technology distributes, captures, analyzes and compresses human emotions obtained from multi vernacular conversations. The technology provides encrypted biometric files that drive rapid distribution and enable advanced communication software. According to one example, the technology harnesses a verbal or textual conversation and provides compressed data that enables holographic software in cars, planes, spaceships, and on hand-held devices and the like. Furthermore, the technology may be employed in a classroom environment to gather intelligence that is applied to create a super-human decision capable robot that can converse and interact on numerous "educational subjects" in a language of the local people or in any world's top languages.

According to one example, verbal communications include translated verbal conversations. According to one example, the system may include a hard-wired communication network or a web-based (e.g., Internet) communication platform. According to one example, the system may employ advanced speech recognition and simultaneous real-time translation software to capture and analyze translated audio in order to extract underlying emotions. Real-time or near real-time indicates that the system and method may process the communication as it is received and may provide an output, such as an immediate translation with underlying emotions, while a conversation is proceeding. For example, spoken language may be processed on the order of seconds, milliseconds, or the like. According to one example, the system and method may evaluate communications in real-time or near real-time, including a written or spoken communications. According to one example, the communications may include live conversations, phone calls, voice portion of video conferences, voicemails, or the like.

According to one example, the technology described herein performs speech recognition, machine translation of speech, and extracts emotion from speech, among performing other actions. According to one example, the system and method may utilize a multilayer adapter that performs automatic speech recognition ("ASR") in a first layer or phase, machine translation ("MT") of speech with sentiment analysis ("SA") in a second layer or phase, and assigns an emotion value to the speech and/or text in a third layer or phase, among performing other actions. According to one example, data may be submitted to a structured data pool upon being assigned the emotion value. According to one example, the structured data pool may be stored in a database such as the human essence database described herein. According to one example, the structured data pool may be organized into libraries.

According to one example, speech data may be obtained from the automatic speech recognition module in the first phase and text data may be obtained from the machine translation module in the second phase. According to one example, the obtained speech and/or text data may be compared against the emotion value data that is assigned values based on identified words, word sequences, and/or phrases. For example, voice patterns may be extracted from the obtained speech and compared to voice pattern-to-emotion definitions. Additionally, the text data may be analyzed for emotion content. For example, words and phrases within the text data may be compared to emotion words and phrases stored in a database. According to one example, the obtained speech and/or text data may be assigned emotion values based on the comparison results. According to one example, emotion data obtained from the original speech and/or text data may be used to generate emotion metadata that is associated with the translated verbal content and/or textual content. For example, emotion translation definitions may be used to translate emotion metadata from a first language into emotion metadata for a second or translated language. According to one example, translated emotion metadata may be used to discover one or more words that have similar emotion connotations in a culture associated with the translated language. One of ordinary skill in the art will readily appreciate that text data with emotion metadata occupies substantially less memory that voice data and is easier to search.

According to one example, the emotion metadata and emotion value data may be stored in libraries that are accessed by a communication system. According to one example, the libraries may be created from case study results obtained from psychologists that link or associate emotions with particular words, word sequences, phrases, or the like. According to one example, emotion values may be assigned for various emotions including happiness, surprise, fear, anger, acceptance, dissatisfaction, courage, pride, frustration, disgust, lust, or the like. According to one example, the system may adjust how the translated language is delivered to a recipient based on the emotion metadata and emotion value data. For example, the communication system may adjust delivery of the translated language to reflect one or more underlying emotions. According to one example, the communication system may adjust delivery through modifying tone, camber, frequency, among other characteristics. According to one example, the communication system may substitute one or more words having a similar emotion connotation for corresponding words translated by the communication system. According to one example, the communication system may associate emotion conditions with one or more words having relevant emotion connotations. Accordingly, the communication system may search for emotion conditions and may present search results that include words having corresponding emotion connotations.

FIG. 1A illustrates a communication system 100 according to one example of the technology. According to one example, the communication system 100 may include communication devices 102a-102n (hereinafter communication devices 102) that interface with a signaling server 104 that supports voice calls, conference calls, video calls, browser-based calls, and network communications between mobile phones or the like. According to one example, the communication system 100 may include a media control unit 106 that supports browser-based calls or the like. According to one example, the browser-based calls may support audio and video signals. According to one example, the media control unit 106 may include an encoder and a decoder (hereinafter "codec" 108) that compresses data for transmission and decompresses data when received. According to one example, the codec 108 may be implemented through a hardware device or a software-based process that compresses and decompresses data for applications such as voice over Internet protocol (VOIP), video conference, and streaming media, or the like. According to one example, the codec 108 may encode source data such as voice and video data that is captured by a microphone or video camera in digital form for transmission to other participants during voice calls, video conferences, media streams, and other broadcasts, or the like. According to one example, the codec 108 may transform data and encapsulate data for transmission across a network. According to one example, a voice and video codec 108 may use a software algorithm that runs on a processor or specialized hardware that is optimized for data encapsulation and decapsulation. According to another example, the codec 108 may utilize an algorithm that converts data into a byte sequence for transmission across a data network and then converts the byte sequence back into voice or video data for reception at an endpoint. According to one example, the media control unit 106 may include a mixer 110 that combines the audio and video signals prior to transmission to the communication devices 102.

Figure 1B:
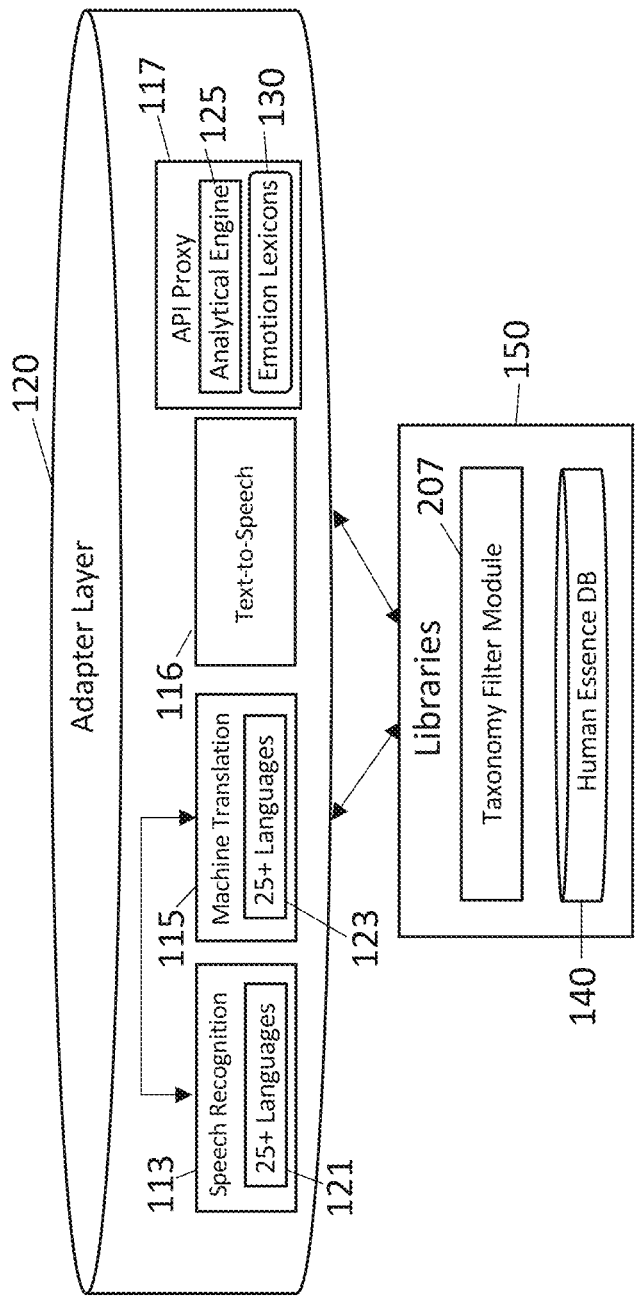
FIG. 1B illustrates a translation server of the communication system according to one example of the technology.

According to one example, the codec 108 may deliver audio signals to a translation server 112. According to one example, the codec 108 may deliver the data across any communication network, including a telephone network, a mobile network supporting 3G or greater, a global computer network, wi-fi, or the like. According to one example, the translation server 112 may include an automatic speech recognition module 113, a database 140, a translator module 115, a text-to-speech module 116, a mixer 118, a library 150, a filter module 207, data pools 155, 160, and a conference configuration 119 or an Application Programming Interface (API) proxy module 117, among other modules. FIG. 1B illustrates various components of the translation server 112 that form an adapter layer 120. According to one example, the adapter layer 120 supports one or more APIs that include a set of functions and/or procedures for accessing features or data associated with an operating system, application, or other service.

According to one example, the adapter layer 120 allows the communication system 100 to communicate with applications that perform desired functions such as speech recognition, machine translation, text-to-speech, or the like. According to one example, the APIs may include applications for plug and play integration. According to one example, the adapter layer 120 may perform functions such as recognizing audio/voice data, filtering data, cleaning data, adjusting speeds for data capture, analyzing data, archiving data, and compressing data, among performing other functions. According to one example, the adapter layer 120 may enable devices with limited memory, such as mobile devices, to access vast data libraries.

According to one example, audio signals may be received at the automatic speech recognition module 113. According to one example, the automatic speech recognition module 113 may communicate with system hardware to identify and/or process human voice obtained from spoken language. For example, the automatic speech recognition module 113 may identify words spoken by a human and/or may authenticate the identity of a human associated with the spoken words. According to one example, the automatic speech recognition module 113 may provide a first level of accuracy when identifying words spoken by a human. According to another example, the automatic speech recognition module 113 may translate words between different languages. According to one example, the communication system 100 may provide acceptable results, with limited latency, for a first level of accuracy. With reference to FIG. 1B, the automatic speech recognition module 113 may communicate within the adapter layer 120 to access one or more software programs that perform speech recognition on the audio signals.

According to one example, the automatic speech recognition module 113 may include a language selection module 121 that is pre-programmed to recognize a plurality of languages. For example, the language selection module 121 may be programmed to automatically recognize spoken languages that are predominantly used in relevant fields, channels, or professions such as business, finance, education, medical, health, legal, political, sports, or the like. According to one example, the language selection module 121 may be programmed to recognize 25, 50, 75, 100, or any number of spoken languages that are predominantly used in a relevant field, channel, or profession. According to one example, the automatic speech recognition module 113 may provide a first level of accuracy during automatic speech recognition. According to one example, the language selection module 121 may receive raw and unstructured voice data at an input. According to one example, the raw and unstructured voice data may be obtained from various sources including real-time conversations, previously recorded conversations, or the like.

Figure 2:
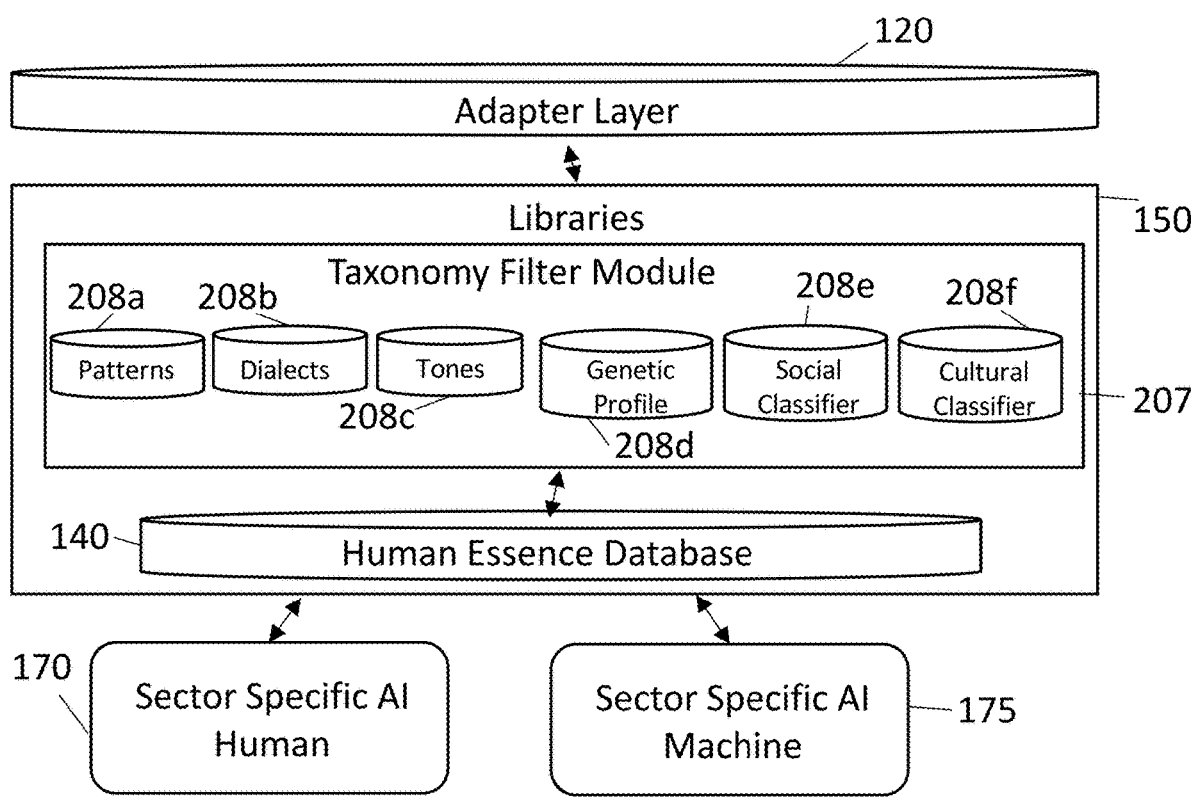
FIG. 2 illustrates an automatic speech recognition module of the communication system according to one example of the technology.

With reference to FIG. 2, the libraries 150 may have a filter module 207 that includes one or more filters. According to one example, the filter module 207 may be communicatively coupled to the automatic speech recognition module 113. According to one example, the filter module 207 may receive audio or voice data that originates from the language selection module 121. According to one example, the audio or voice data may include representations of sounds or speech uttered by a speaker including languages, dialects, speech patterns, biometrics, or the like. According to one example, sounds may be transmitted through the atmosphere to a microphone that converts the sounds to electrical or optical signals that may be stored in a memory device; broadcast using a speaker; transmitted over communications media such as wireless media, electrical wire media, optical fiber media; or the like. One of ordinary skill in the art will readily appreciate that the filter module 207 may receive and process text files, graphical files, hologram images, quantum images, or other file types.

According to one example, the filter module 207 may include a variety of filter types. For example, the filter types may include user-specific filters and non-user-specific filters, among other filter types. According to one example, the user-specific filters may include filters associated with characteristics or qualities of individual users, while the non-user-specific filters may include filters associated with characteristics or qualities of a general population of users.

According to one example, the user-specific filters may include a pattern filter 208a, a dialects filter 208b, a tone filter 208c, or the like. The user-specific filters define unique aspects of a user's communication. According to one example, the user-specific filters may optimize a context for a speaker or a user. According to one example, the pattern filter 208a may provide an accurate and nuanced translation based on contextual information obtained from the spoken language. For example, the pattern filter 208a may differentiate among speech patterns that indicate a relaxed or calm speaker as opposed to speech patterns that indicate a tense or excited speaker. According to one example, a relaxed or calm speaker may be associated with a speech pattern that includes low to medium average pitch; clear and continuous tone; periodic cadence; and low to medium amplitude. In contrast, a tense or excited speaker may be associated with a speech pattern that includes a changing (low to high) pitch; changing (low to high) tone; varying cadence; and changing amplitude.

According to one example, the pattern filter 208a may correlate a user's speech pattern to speech variances associated with local or area specific speech patterns. Alternatively, the pattern filter 208a may correlate a user's speech pattern to speech variances associated with a specific country including its local regions and communities. According to one example, the pattern filter 208a may store speech patterns in translation libraries. The speech patterns may be obtained from various users or communicators. According to one example, the translation libraries may be classified into specific libraries including work libraries, social libraries, private life libraries, or the like. The translation libraries may be selected to capture context of a communication. According to one example, the context may be relied upon to correlate accurate emotion with the speech pattern. The communication context may be used to more accurately capture a speaker, an audience, circumstances of a communication, or the like. According to one example, if context information is not initially available, the communication system 100 may select a generic context and thereafter attempt to determine a more accurate context based on information obtained during a communication. According to one example, voice patterns obtained during a communication may be employed to identify the user and/or the audience. When the communication system 100 obtains sufficient information from a communication to identify context, the context information may be employed to refine data gathering and data storage in appropriate libraries. According to one example, the variance or pattern filter 208a is a taxonomy that represents translated vocal data with underlying emotions. According to one example, the communication system 100 may apply the speech patterns to identify characteristics of a user or communicator such as birth country of origin, foreign influences that converge a communicator's speech pattern over time, or the like. According to one example, user-specific speech patterns may be needed to differentiate among more subtle emotions.

According to one example, the dialects filter 208b may correlate a user's speech pattern to a specific region within the world. According to one example, the dialects filter 208b is a taxonomy that stores vernacular languages analyzed with emotion. According to one example, the dialects filter 208b may be used to rapidly populate a communicator's translation libraries. According to one example, the dialects filter 208b may be used in a professional setting, a medical setting, a leisure setting, or the like. According to one example, the dialects filter 208b may match verbal expressions with emotion. For example, the dialects filter 208b may match verbal expressions with a particular set of emotions based on verbal expressions used at particular events, verbal expressions used during one-on-one conversations, or the like. According to one example, a region may include a territory that covers one or more countries. Alternatively, a region may include a territory that is smaller than a country. According to one example, the adapter layer 120 may include one or more software programs that detect speech patterns and dialects based on speech patterns obtained from users.

According to one example, the tones filter 208c extracts biometric information or voice imprint data such as tone, pattern, annunciation, accent, or the like. For example, the communication system may determine a user's emotions based on nuances detected in spoken language such as voice imprint data having inflections, measured stress levels, or the like. According to one example, information regarding an audience provides data that is relevant to tones. According to one example, the audience may include friends, family, business associates, accountants, attorneys, medical professionals, entertainers, or the like. The user may select a different tone depending on the audience. For example, a mother may use a stern tone with a child, a casual tone with a spouse, a formal tone with a business associate, a jovial tone with an entertainer, and the like.

According to one example, the audience information may be manually entered or derived from available data. For example, if a user communicates by telephone, the communication system 100 may extract audience information from a contacts application, a calendar entry, or the like. According to the example of a mobile telephone, the tones filter 208c may assume that the identity of the user corresponds to the owner of the mobile telephone. Furthermore, the tones filter 208c may assume audience information from the contacts application, calendar entries, or the like. Alternatively, user and/or audience information may be determined from tonal information, voice pattern information, or the like. According to one example, the tones filter 208c is a taxonomy that represents a vocal range and resonance of communicators whose voices are analyzed and extracted for the underlying emotion value such as pitch, temperament, level of comfort, or the like. According to one example, the communication system 100 may utilize data from the tones filter 208c to provide anonymous biometric or voice imprint information. According to one example, the communication system 100 may adopt tones associated with the communicators to accompany the verbal expressions that occur between the communication system 100 and the communicators.

According to one example, the communication system 100 may associate emotion metadata with corresponding verbal or text data based on information obtained from the user-specific filters 208a-208c. According to one example, the user-specific filters 208a-208c may identify a dozen basic human emotions along with a couple degrees of the human emotions. According to one example, the communication system 100 may further classify the emotions into emotional states such as happiness; surprise; pride; acceptance; boredom; envy; disgust; sadness; guilt; fear; or the like.

Furthermore, the filter module 207 may include one or more filters that correspond to general or non-user-specific filters. According to one example, the general filters may include a genetic profile filter 208d, a social classifier filter 208e, a cultural classifier 208f, or the like. According to one example, the genetic profile filter 208d may analyze tones, dialect, and speech patterns obtained from various users. According to one example, the genetic profile filter 208d may correlate speech patterns and manners of speech obtained from two or more users to identify users that are related by familiar generations such as siblings, parents, grandparents, cousins, or the like. According to one example, the communication system 100 may diverge genetic data such as speech pattern data, speech tone data, and dialect data into smaller data packets that may be accessed and utilized in research and development. According to one example, the adapter layer 120 may collect and apply speech pattern data to translate speech or to refine an existing translation. According to one example, the adapter layer 120 may employ the speech pattern data to decrease an amount of metadata needed to identify a starting point for the communication system 100.

According to one example, the communication system 100 may include the social classifier filter 208e and the cultural classifier filter 208f as taxonomy that represent the extraction of localized emotional influences obtained from communicators. According to one example, the localized emotional influences may include hierarchical social categories. Additionally, or alternatively, the localized emotion influences may include a user's knowledge, experience, beliefs, values, or the like. According to one example, the social classifier filter 208e and the cultural classifier filter 208f may provide localization after a particular cognitive state is attained through the genetic profile filter 208d. According to one example, the social classifier filter 208e may track a user's lifestyle to determine emotions associated with events attended by the user including sporting events, social events including at a bar/restaurant, meditation sessions, yoga sessions, or the like. According to one example, the communication system 100 may examine events associated with a user's lifestyle and associate emotions based on the events.

According to one example, the cultural classifier filter 208f analyzes user characteristics such as country of origin, manner of speech, accent, terminology, perspective, or the like. According to one example, the communication system 100 may learn to mimic a user's cultural and social nuances. The communication system 100 may employ these nuances during a conversation between culturally diverse speakers. For example, the communication system 100 may analyze cultural data associated with emotion metadata to generate a hologram that includes mannerisms that are adjusted for delivery of emotion. One of ordinary skill in the art will readily appreciate that the communication system 100 may employ other filters to determine user characteristics such as an education filter, a professions filter, a spiritual filter, or the like.

While FIG. 2 illustrates a filter module 207 having six filters, one of ordinary skill in the art will readily appreciate that the filter module 207 may include any number of filters. According to one example, the communication system 100 may receive raw data in the form of audio files. According to one example, the analytical engine 130 may receive and organize the raw data into categories based on emotions, prior to populating corresponding filters 208a-208f. According to one example, the communication system 100 may access the filters 208a-208f in parallel fashion, in serial fashion, or a combination of parallel and serial fashions. For example, the communication system 100 may access the filters 208a-208f simultaneously. Additionally, or alternatively, the communication system 100 may access the filters 208a-208f sequentially. For example, the communication system 100 may access the filters in sequence starting with filter 208a and ending with filter 208f. One of ordinary skill in the art will readily appreciate that the filters 208a-208f may be accessed in any order. Additionally, or alternatively, the communication system 100 may access the filters 208a-208f both in sequence and simultaneously. According to one example, the communication system 100 may access the filters 208a-208f in any order as determined by a selected language and its underlying emotion value. According to one example, the access order may relate to a topic of conversation and a region or locality where a conversation is occurring. Additionally, or alternatively, the communication system 100 may parse the translated audio files and their underlying emotions to selected filters 208a-208f based on specific requirements.

According to one example, the communication system 100 may apply all filters when the relevant channel or profession is business. According to another example, the communication system 100 may apply two filters when the relevant channel or profession is political. One of ordinary skill in the art will readily appreciate that the communication system 100 may select or apply any number of filters based on any relevant channel or profession, among other criteria. For example, other criteria may include adding or subtracting content that is associated with a filter. With respect to access order, the communication system 100 may access one or more filters based on a complexity of the selected language, capabilities of the access device, capabilities of the communication path, system resources, time of day, or the like. According to one example, the communication system 100 may access data generated by the automatic speech recognition module 113. According to one example, the communication system 100 may store the accessed data in database 140 or may employ the data in another manner. According to one example, the database 140 may include a human essence database ("HU DB"). According to one example, the communication system 100 may store the data in real-time. Alternatively, the communication system 100 may batch and store the data after a time delay. According to one example, the database 140 may provide data to a channel specific or sector specific artificial intelligence ("AI") human application 170 associated with human learning. Alternatively, the database 140 may provide data to a channel specific or sector specific artificial intelligence ("AI") machine application 175 associated with machine learning. According to one example, the channel specific or sector specific AI applications enhance speed, efficiency, and responsiveness of the communication system 100 by presenting data that is relevant to a task.

With reference to FIGS. 1A and 1B, the translation server 112 may include a machine translator 115 that is communicatively coupled to the automatic speech recognition module 113, among other modules or components. According to one example, the machine translator 115 may obtain audio data directly from the automatic speech recognition module 113. Additionally, or alternatively, the machine translator 115 may obtain audio data from the database 140 as illustrated in FIG. 1A. According to one example, the machine translator 115 may be communicate within the adapter layer 120 to access one or more software programs that translate audio signals. The machine translator 115 may include a language selection module 123 that is pre-programmed to recognize a plurality of languages. According to one example, the language selection module 123 may be programmed to include similar languages to those included in the language selection module 121 associated with the automatic speech recognition module 113.

According to one example, the language selection module 123 may be pre-programmed to automatically recognize a set of languages that are predominantly used in known fields or professions such as business, finance, education, medical, health, legal, political, or the like. According to one example, the language selection module 123 may be pre-programmed to recognize 25, 50, 75, 100, or any number of languages that are predominantly used in a known field or profession. According to one example, the communication system 100 may receive textual data from the machine translator 115. According to one example, the communication system 100 may store the textual data in the database 140 or may employ the data in another manner. According to one example, the communication system 100 may store the data in real-time. Alternatively, the communication system 100 may batch and store the data after a time delay.

With reference to FIGS. 1A and 1B, the translation server 112 may include a text-to-speech module 116 that is communicatively coupled to the machine translator 115, among other modules or components. According to one example, the text-to-speech module 116 may receive textual data directly from the machine translator 115. Additionally, or alternatively, the text-to-speech module 116 may obtain the textual data from the database 140. According to one example, the database 140 may be communicatively coupled to the university data pool 155 that stores information needed to perform business transactions between data partners in a standardized way. Furthermore, the database 140 may be communicatively coupled to the DNA lab 160 that provides genetic data to the communication system 100. According to one example, the text-to-speech module 116 may communicate within the adapter layer 120 to access one or more software programs that perform text-to-speech conversion of the textual data.

According to one example, the translation server 112 may include an application programming interface (API) proxy 117 that is communicatively coupled to the text-to-speech module 116 within the adapter layer 120, among other modules or components. According to one example, the API proxy 117 may include an emotion lexicon 125 and an analytical engine 130 that access textual data generated by the text-to-speech module 116. According to one example, the emotion lexicon 125 may include a language selection module 126 that is pre-programmed to recognize a plurality of languages. According to one example, the language selection module 126 may include the same languages that are included in the language selection module 121 associated with the automatic speech recognition module 113 and/or the language selection module 123 associated with the machine translator 115. According to one example, the emotion lexicon 125 and the analytical engine 130 may receive the textual data through the API proxy 117, which interfaces with backend services of the communication system 100. One of ordinary skill in the art will readily appreciate that the emotion lexicon 125 and the analytical engine 130 may access other data types including voice data or the like.

According to one example, the adapter layer 120 includes the API proxy 117 and the automatic speech recognition module 113 having the filter module 207. According to one example, the emotion lexicon 125 may assign a sentiment value or an emotion value to the textual data. For example, the emotion lexicon 125 may analyze the textual data and may assign emotion values for words, phrases, sentences, paragraphs, or the like. According to one example, the analytical engine 130 may receive emotion values from a case study database that stores emotion value data gathered from case studies that associate emotion values with words, phrases, sentences, paragraphs, or the like. According to one example, the case studies may analyze content such as a words, phrases, sentences, or paragraphs as used in specific contexts or channels such as business, finance, education, medical, health, legal, political, sports, or the like. According to one example, the analytical engine 130 may assign emotion values to the analyzed content that correspond to emotions such as being happy, excited, sad, depressed, frustrated, angry, or the like.

According to one example, the analytical engine 130 may assign emotion values to the analyzed content within an appropriate channel or context of business, finance, education, medical, health, legal, political, sports, or the like. According to one example, the communication system 100 may link the emotion values to the corresponding analyzed content. In this way, the communication system 100 may graphically display emotions alongside the corresponding analyzed content. For example, the communication system 100 may assign a value of "1" to analyzed content that is associated with being happy; a value of "2" to analyzed content that is associated with being excited; a value of "3" to analyzed content that is associated with being sad; a value of "4" to analyzed content that is associated with being depressed; a value of "5" to analyzed content that is associated with being frustrated; a value of "6" to analyzed content that is associated with being angry, and so forth.

According to one example, the communication system 100 may employ a selected characteristic that corresponds to the assigned value and represents an emotion. For example, the communication system 100 may select colors that correspond to the assigned values and visually represent emotions. According to one example, the color yellow may be selected to correspond to "1" and represent being happy; the color blue may be selected to correspond to "2" and represent being excited; the color orange may be selected to correspond to "5" and represent frustration; the color red may be selected to correspond to "6" and represent anger; and so on. Accordingly, if the communication system 100 detects the word "excellent" in the context of education, it may be assigned a value of "1" and may be graphically illustrated by the color yellow to indicate being happy. Alternatively, if the communication system 100 detects a phrase "needs improvement" in the context of education, it may be assigned a value of "5" and may be graphically illustrated by the color orange to indicate being frustrated. According to one example, textual features may be graphically illustrated in the selected color. Alternatively, non-textual features such as background may be graphically illustrated in the selected color. One of ordinary skill in the art will readily appreciate that various characteristics may be employed to represent emotions including color, text size, text shape, sounds, smells, actions, or the like.

According to one example, the emotion value data generated by the analytical engine 130 may be stored in an emotional lexicon database 125, the filter module 207, or employed in another manner. According to one example, the emotion value data may be stored in real-time. Alternatively, the emotion value data may be batched and stored after a time delay. According to one example, the emotional lexicon database 125 may store a library of emotions for each of a plurality of languages. According to one example, the plurality of languages may include 25, 50, 75, 100, or any number of languages that are predominantly used in a relevant field or profession. Additionally, or alternatively, the plurality of languages may be employed to develop individual emotion lexicons within the emotional lexicon database 125. For example, the plurality of languages may be paired with audio snippets or whole conversations. According to one example, the emotional lexicon database 125 may require frequent sorting and restructuring, leading to a phasing out of text-based sentiment analysis via the text-to-speech module 116.

With reference to FIG. 1B, the adapter layer 120 may communicate with the library 150 and the human essence database 140 that receives speech data generated by the automatic speech recognition module 113, textual data generated by the machine translator 115, and emotion value data generated by the analytical engine 130, for example. According to one example, the human essence database 140 may associate stored data with specific users. According to another example, the human essence database 140 may associate stored data with relevant channels such as profession, education, social, spiritual, leisure, or the like. According to one example, the automatic speech recognition module 113 may communicate with the university data pool 155 and the DNA lab 160, among other data sources, which provide additional metadata. According to one example, the university data pool 155 is a gateway that provides access to networks that maintain information for performing business transactions in a standardized way. According to one example, the communication system 100 may capture user biometrics information that is stored anonymously in an encrypted format using a security key.

Figure 3:
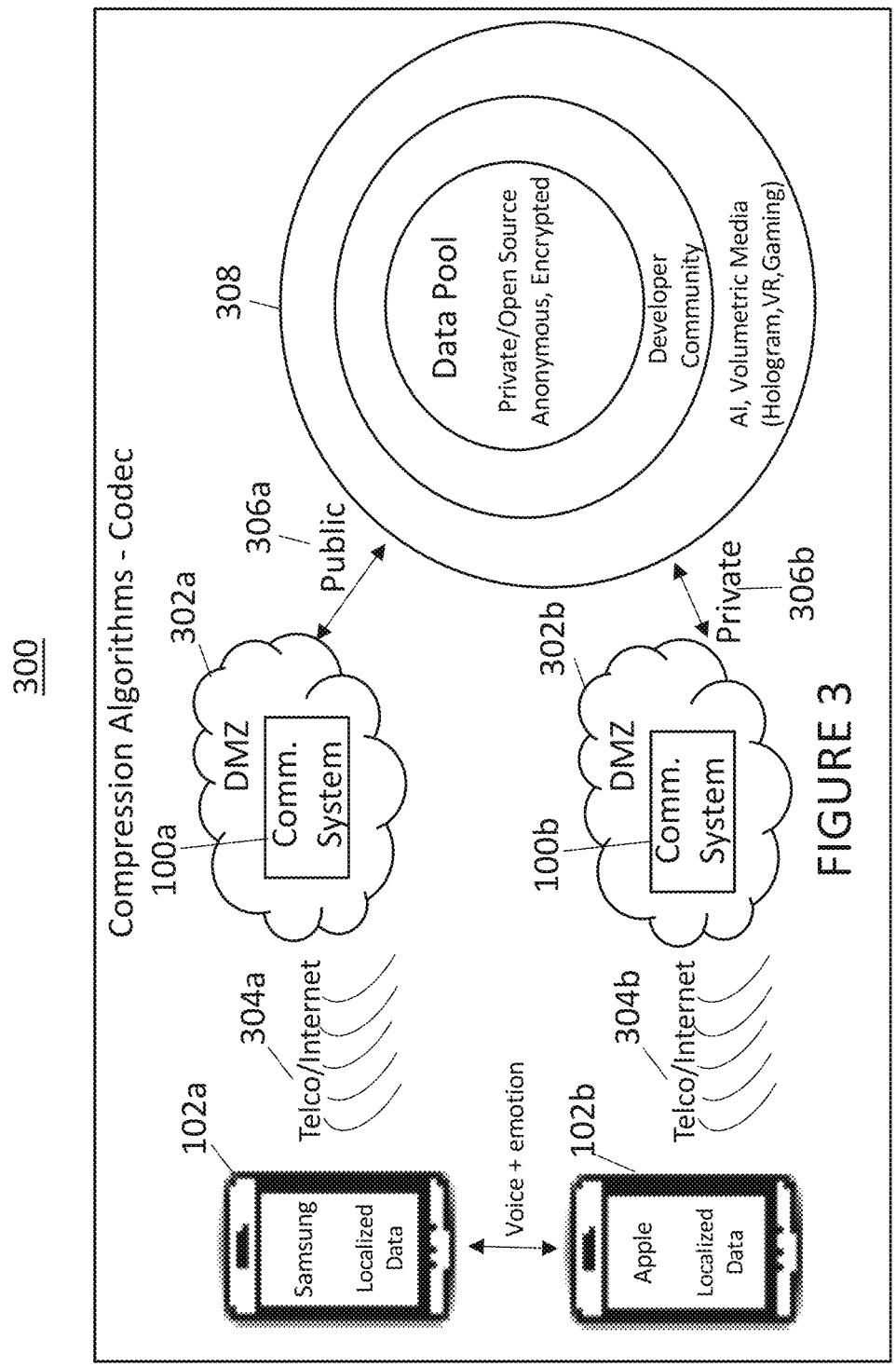
FIG. 3 illustrates an environment for the communication system according to one example of the technology.

FIG. 3 illustrates one example of an environment in which the technology may be used. According to one example, the communication system 100a may include infrastructure and software applications that act as middleware, residing within an intranet or a demilitarized zone ("DMZ") 302a provided between a private network 304a and a public network 306a. According to one example, the communication system 100a may reside within an intranet between a finance company's private communication system 304a and a public network 306a. Alternatively, the communication system 100b may reside within an intranet between a telephone company's private network 304b and a public network 306b. For example, the communication systems 100a, 100b may provide commodity-based communications that enable faster language translation services, along with rapid extraction and analysis of emotion metadata. According to one example, the communication systems 100a, 100b may analyze verbal data and/or text data associated with emotion metadata and may generate data that includes biometric files associated with humans and super-human machines. According to one example, the communication systems 100a, 100b may advance development and localization of the biometric files with user-specific data gathered through continuous interaction with a series of algorithms and processes, both manual and automatic, as described herein. Data pool 308 stores information needed to perform business transactions across communication systems 100a, 100b. According to one example, a first portion of data pool 308 may be segregated for private/open source data, a second portion of data pool 308 may be segregated for the developer community; and a third portion of data pool 308 may be segregated for virtual reality, gaming, and hologram applications.

Figure 4:
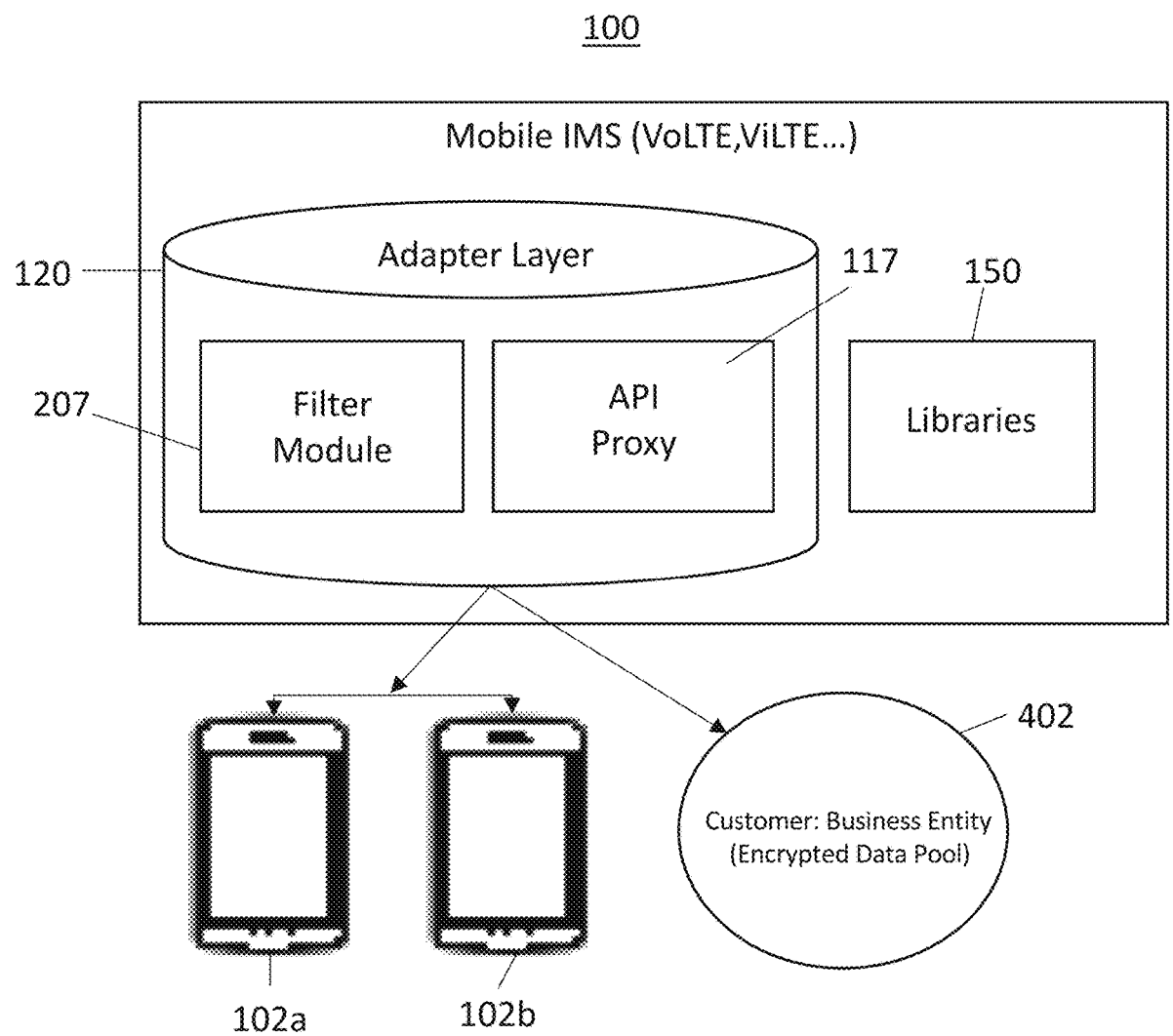
FIG. 4 illustrates the communication system according to another example of the technology.

FIG. 4 illustrates one example of the communication system 100 interacting with mobile devices 102a, 102b.

According to one example, the communication system 100 includes the adapter layer 120, the filter module 207, the API proxy, and the libraries 150 that provide emotion data to third parties through an encrypted data pool 402. According to one example, the emotion data may include encrypted emotion data obtained from the database 140. According to one example, the data pool 402 stores information needed to perform business transactions.

Figure 5:
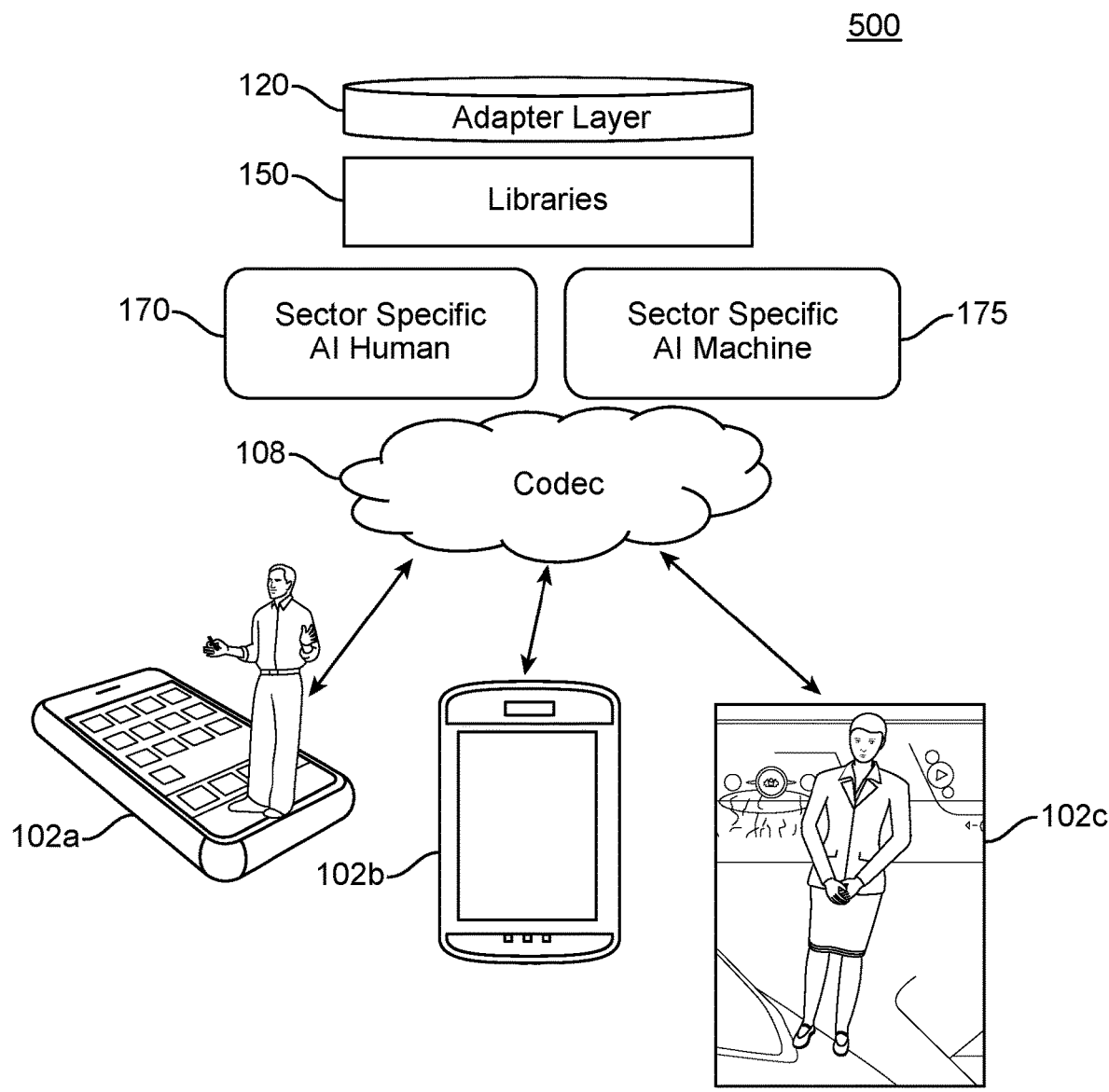
FIG. 5 illustrates the communication system according to yet another example of the technology.

FIG. 5 illustrates one example of an environment 500 where the communication system 100 supports communications between humans through mobile devices 102a, 102c and with a machine through device 102b. According to one example, the mobile device 102a is associated with a first caller and generates a hologram image based on verbal data and emotion metadata associated with the mobile device 102c linked to a second caller. For example, the mobile device 102a may generate the hologram image from a phone display. According to one example, the mobile device 102c is associated with a second caller and generates a hologram image based on verbal data and emotion metadata associated with the mobile device 102a linked to the first caller. For example, the mobile device 102c may generate the hologram image from a vehicle display. According to examples described herein, the communication system 100 may analyze verbal data and/or text data associated with mobile devices 102a, 102c and may generate emotion metadata therefrom. According to one example, the emotion metadata may be obtained from the libraries 150 and/or from the sector specific AI human database 170. According to one example, the sector specific AI human database 170 may reside in a cloud environment and/or the data may be stored locally on devices 102a, 102c.

FIG. 5 further illustrates an example of the environment 500 enabling communications between a human and a machine through mobile device 102a, 102b. According to one example, the mobile device 102b is associated with a computerized persona powered by machine intelligence, including verbal data and emotion metadata associated with a channel or specific sector. According to one example, the mobile device 102a is associated with a first caller and generates a hologram image based on verbal data and emotion metadata associated with the mobile device 102b linked to the computerized persona powered by machine intelligence. For example, the mobile device 102a may generate the hologram image from a phone display. According to one example, the mobile device 102b is associated with the computerized persona powered by machine intelligence and does not generate a visual image based on the mobile device 102a linked to the first caller. According to examples described herein, the communication system 100 may analyze verbal data, text data, and/or machine intelligence associated with the mobile devices 102a, 102b and may generate emotion metadata therefrom. According to one example, the emotion metadata may be obtained from the libraries 150, from the sector specific AI human database 170, and/or from the sector specific AI machine database 175. According to one example, the sector specific AI human database 170 and/or the sector specific AI machine database 175 may reside in a cloud environment and/or locally on devices 102a, 102b.

According to one example, the codec 108 may compress biometric data that is communicated between the adapter layer 120, the sector specific AI human database 170, the sector specific AI machine database 175, and the mobile devices 102a-102c, among other components. According to one example, the sector specific AI human database 170 may store relevant localized data to enhance speed, efficiency, and responsiveness of the communication system 100. According to one example, the codec 108 may deliver the data across any communication network, including a telephone network, a mobile network supporting 3G or greater, a global computer network, wi-fi, or the like. According to one example, the communication system 100 may compress the verbal data and the emotion metadata for distribution using limited bandwidth. According to one example, the mobile devices 102a, 102c may generate the hologram images from a local application that resides on the corresponding mobile device 102a, 102c or from the sector specific AI human database 170 to adjust the voice data in tone, camber, and frequency to deliver emotion associated with the speaker. Furthermore, the mobile devices 102a, 102c may access cultural data associated with emotion metadata to generate hologram images that include mannerisms reflecting the speaker's mannerisms.

Figure 6:
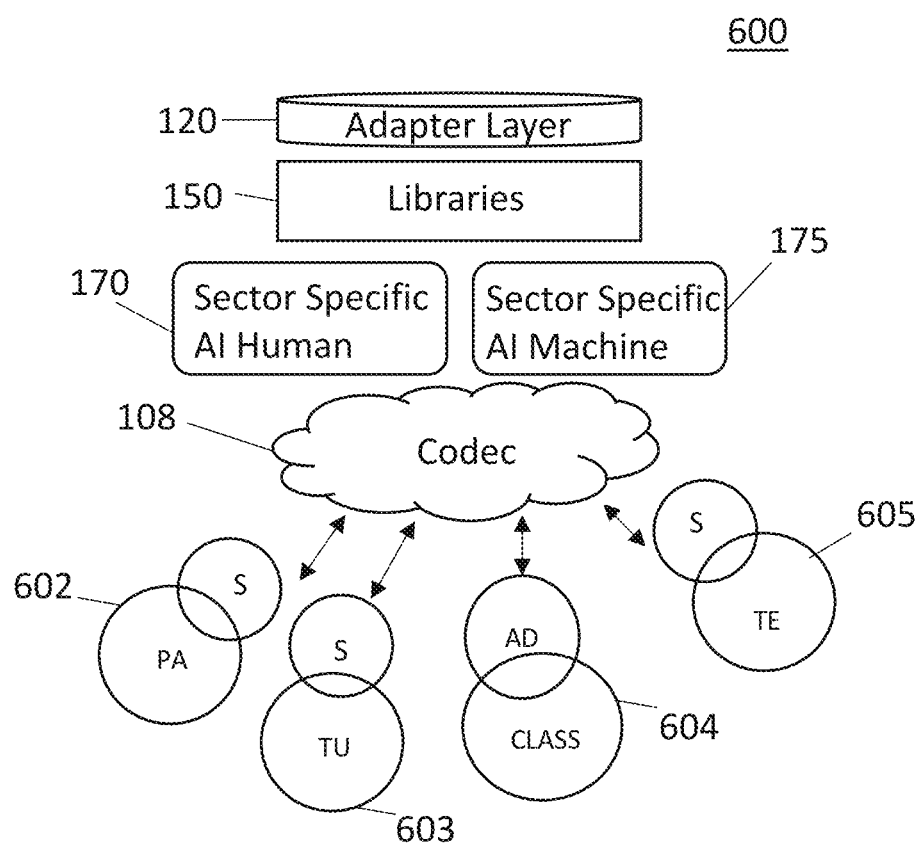
FIG. 6 illustrates the communication system according to yet another example of the technology.

FIG. 6 illustrates one example of an environment 600 where the communication system 100 supports decision capable artificial intelligence applications. According to one example, the communication system 100 may capture interactions between several humans to analyze verbal data and/or text data in order to generate emotion metadata therefrom. For example, the human interactions may be captured in a classroom environment between teachers, students, administrators, parents, tutors, or the like. According to one example, the human interactions may be classified as parent/student interactions 602, tutor/student interactions 603, administrator/class interactions 604, and teacher/student interactions 605, among other human interactions. According to one example, the communication system 100 may extract verbal data and emotion metadata associated with the human interactions. According to examples described herein, the communication system 100 may analyze the verbal data and/or text data associated with the human interactions and may generate emotion metadata therefrom that is employed to enhance machine intelligence developed for the classroom environment. According to one example, the emotion metadata may be obtained from the libraries 150, from the sector specific AI human database 170, and/or from the sector specific AI machine database 175. According to one example, the sector specific AI human database 170 and/or the sector specific AI machine database 175 may reside in a cloud environment and/or the data may be stored locally on a school server.

According to one example, the codec 108 may compress biometric data that is communicated between the adapter layer 120, the sector specific AI human database 170, and the sector specific AI machine database 175, among other components. According to one example, mobile devices may be employed to capture the human interactions. Alternatively, or additionally, audio and visual devices may be employed within classrooms to capture verbal or visual data. According to one example, the sector specific AI human database 170 and the sector specific AI machine database 175 may store relevant localized data to enhance speed, efficiency, and responsiveness of the communication system 100. According to one example, the codec 108 may deliver the data across any communication network, including a telephone network, a mobile network supporting 3G or greater, a global computer network, wi-fi, or the like. According to one example, the communication system 100 may compress the verbal data and the emotion metadata for distribution using limited bandwidth.

According to one example, the devices (not shown) within the classroom environment may generate visual images such as hologram images from a local application that resides on the devices or from the sector specific AI human database 170 and/or the sector specific AI machine database 170 to adjust the voice data in tone, camber, and frequency to deliver emotion associated with the desired actor such as a teacher, tutor, administrator, or the like. Furthermore, the communication system 100 may analyze cultural data associated with emotion metadata to generate content that includes mannerisms that reflect mannerisms of the desired actor such as a teacher, tutor, administrator, or the like. One of ordinary skill in the art will readily appreciate that the communication system 100 may generate additional content that mimics human intelligence and that expresses human qualities and characteristics. According to examples described herein, the communication system 100 may create super-human decision capable machines that perform duties associated with desired actors such as teachers, tutors, administrators, or the like. According to one example, the decision capable machine may analyze verbal data and/or text data associated with the several human interactions to create machine intelligence with emotion metadata.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A communication system that generates emotion metadata associated with verbal content and text content, the communication system comprising:
   a media control unit that is communicatively coupled to a first communication device associated with a human and a second communication device associated with a computerized persona powered by machine intelligence;
   a translation server that is communicatively coupled to the media control unit, the translation server being adapted to receive first verbal content and first text content from the first communication device in a first language;
   an adapter layer that is communicatively coupled to the translation server, the adapter layer having a plurality of filters that determine emotion associated with the first verbal content and the first text content, wherein the adapter layer associates first emotion metadata with the first verbal content and the first text content based on the determined emotion;
   an emotion lexicon that is communicatively coupled to the adapter layer, wherein the emotion lexicon links a first emotion value to the corresponding first verbal content and first text content;
   an artificial intelligence machine database that stores second emotion metadata corresponding to second verbal content and second text content associated with the second communication device; and
   a display associated with the first communication device that generates hologram images having mannerisms that correspond to the second emotion metadata associated with the second verbal content and the second text content.

2. The communication system according to claim 1, wherein the plurality of filters include user-specific filters and non-user-specific filters.

3. The communication system according to claim 1, further comprising a third communication device coupled to the media control unit, the third communication device being associated with a second human, the third communication device having a display that generates hologram images with mannerisms corresponding to the first emotion metadata associated with the first verbal content and the first text content.

4. The communication system according to claim 1, further comprising an analytical engine that is communicatively coupled to the adapter layer and the emotion lexicon, the analytical engine being configured to assign emotion values based on context including at least one of business, finance, education, medical, legal, political, and sports.

5. The communication system according to claim 1, further comprising a database that is communicatively coupled to the adapter layer and the emotion lexicon, wherein the database stores data associated with specific users.

6. The communication system according to claim 5, wherein the database is communicatively coupled to a data pool that provides biometric information regarding users.

7. The communication system according to claim 1, further comprising a third communication device that is communicatively coupled to the translation server, wherein the third communication device receives translated verbal content and text content with associated emotion metadata in a second language, the second language being different than the first language.

8. The communication system according to claim 7, wherein the translated verbal content with associated emotion metadata includes voice data adjusted in (i) tone, (ii) camber, (iii) frequency, or any combination of (i)-(iii).

9. The communication system according to claim 7, wherein the translated verbal content with associated emotion metadata includes cultural data with mannerisms.

10. The communication system according to claim 1, wherein the second communication device is communicatively coupled to a server that provides the computerized persona powered by machine intelligence.

11. A non-transitory computer-readable storage medium having stored therein instructions which, when executed by a microprocessor, causes a communication system that generates emotion metadata associated with verbal content and text content to:

receive first verbal content and first text content in a first language from a first communication device associated with a human;

determine emotion associated with the first verbal content and the first text content;

associate first emotion metadata with the first verbal content and the first text content based on the determined emotion;

link a first emotion value to the corresponding first verbal content and first text content;

receive, from a second communication device associated with a computerized persona powered by machine intelligence, second emotion metadata corresponding to second verbal content and second text content; and generate, on the first communication device, hologram images having mannerisms that correspond to the second emotion metadata associated with the second verbal content and the second text content.

12. The non-transitory computer-readable storage medium of claim 11, wherein the instructions, when executed by the microprocessor, cause the communication system to determine emotion using user-specific filters and non-user-specific filters.

13. The non-transitory computer-readable storage medium of claim 11, wherein the instructions, when executed by the microprocessor, cause the communication system to communicate with a third communication device associated with a second human and generate hologram images with mannerisms corresponding to the first emotion metadata associated with the first verbal content and the first text content.

14. The non-transitory computer-readable storage medium of claim 11, wherein the instructions, when executed by the microprocessor, cause the communication system to assign emotion values based on context including at least one of business, finance, education, medical, legal, political, and sports.

15. The non-transitory computer-readable storage medium of claim 11, wherein the instructions, when executed by the microprocessor, cause the communication system to store data associated with specific users.

16. The non-transitory computer-readable storage medium of claim 15, wherein the instructions, when executed by the microprocessor, cause the communication system to obtain biometric information regarding users.

17. The non-transitory computer-readable storage medium of claim 11, wherein the instructions, when executed by the microprocessor, cause the communication system to provide translated verbal content and text content with associated emotion metadata in a second language, the second language being different than the first language.

18. The non-transitory computer-readable storage medium of claim 17, wherein the instructions, when executed by the microprocessor, cause the communication system to provide voice data adjusted in (i) tone, (ii) camber, (iii) frequency, or any combination of (i)-(iii).

19. The non-transitory computer-readable storage medium of claim 17, wherein the instructions, when executed by the microprocessor, cause the communication system to provide cultural data with mannerisms.

20. The non-transitory computer-readable storage medium of claim 11, wherein the instructions, when executed by the microprocessor, cause the communication system to obtain the computerized persona powered by machine intelligence from a server.

* * * * *